United States Patent
Eisenhauer et al.

(10) Patent No.: US 8,355,345 B2
(45) Date of Patent: Jan. 15, 2013

(54) APPARATUS, SYSTEM, AND METHOD FOR ESTABLISHING POINT TO POINT CONNECTIONS IN FCOE

(75) Inventors: Daniel G. Eisenhauer, Austin, TX (US); Roger G. Hathorn, Tucson, AZ (US); Louis W. Ricci, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/535,465

(22) Filed: Aug. 4, 2009

(65) Prior Publication Data

US 2011/0032933 A1    Feb. 10, 2011

(51) Int. Cl.
*H04L 12/28* (2006.01)
*H04L 12/56* (2006.01)
*H04L 12/54* (2006.01)

(52) U.S. Cl. ............ 370/254; 370/400; 370/428; 398/58

(58) Field of Classification Search .................. 370/254, 370/400, 428; 398/58
See application file for complete search history.

(56) References Cited

U.S. PATENT DOCUMENTS

| | | | |
|---|---|---|---|
| 7,124,205 B2 | 10/2006 | Craft et al. | |
| 7,352,706 B2 * | 4/2008 | Klotz et al. ................... | 370/254 |
| 7,366,194 B2 | 4/2008 | Yu et al. | |
| 7,430,203 B2 | 9/2008 | Millet et al. | |
| 2003/0152182 A1 | 8/2003 | Pai et al. | |
| 2004/0210584 A1 | 10/2004 | Nir et al. | |
| 2006/0023707 A1 * | 2/2006 | Makishima et al. .......... | 370/389 |
| 2008/0008202 A1 | 1/2008 | Terrell et al. | |
| 2009/0037977 A1 * | 2/2009 | Gai et al. .......................... | 726/1 |
| 2009/0161692 A1 * | 6/2009 | Hirata et al. ................... | 370/466 |
| 2009/0252181 A1 * | 10/2009 | Desanti ......................... | 370/474 |
| 2009/0254677 A1 * | 10/2009 | Desanti ......................... | 709/242 |
| 2010/0115132 A1 * | 5/2010 | Hirata et al. .................. | 709/245 |
| 2011/0044344 A1 * | 2/2011 | Hudson et al. ........... | 370/395.53 |

OTHER PUBLICATIONS

M. Guizani, "ATM Architectures Using Optical Technology: An Overview of Switching, Buffering and Multiplexing", International Journal of Network Management, vol. 7, pp. 198-220, (1997).

(Continued)

*Primary Examiner* — Alpus H Hsu
*Assistant Examiner* — Yee Lam
(74) *Attorney, Agent, or Firm* — Kunzler Law Group, PC (57) ABSTRACT

An apparatus, system, and method are disclosed for establishing a point-to-point connection using Fibre Channel over Ethernet (FCoE). The point-to-point connection is established as part of the FCoE Initialization Protocol (FIP). A first computing device sends a FIP discovery solicitation to a predefined address such as ALL-FCF-MACs. The first computing device also listens to the local ALL-FCF-MACs address and determines whether or not there are any switches in the fabric connecting the first computing device and the second computing device. If there are no switches, the first computing device sends a second FIP discovery solicitation with a point-to-point indicator. If the first computing device receives a similar FIP discovery solicitation from the second computing device, it sends a FIP discovery advertisement with the point-to-point indicator. The first computing device and second computing device then perform fabric login and establish a point to point connection.

24 Claims, 6 Drawing Sheets

OTHER PUBLICATIONS

Manolis Marazakis et al., "Efficient Remote Block-level I/O over an RDMA-capable NIC", Institute of Computer Science (ICS), pp. 97-106, Jun. 2006.

Renato John Recio, "Server I/O Networks Past, Present, and Future", Proceedings of the ACM SIGCOMM 2003 Workshops, pp. 162-178, Aug. 2003.

"Introduction to Fibre Channel over Ethernet (FCoE) a Detailed Review", EMC2 where information lives, White Paper, Nov. 2008.

Dave Peterson, "FC-LS: Point-to-Point FLOGI clarification", CNT (05-239v0).

PCT/EP2010/060618, International Search Report and Written Opinion, Sep. 7, 2010.

* cited by examiner

APPARATUS, SYSTEM, AND METHOD FOR ESTABLISHING POINT TO POINT CONNECTIONS IN FCOE

BACKGROUND

1. Field

This invention relates to initializing and maintaining a point-to-point connection in Fibre Channel over Ethernet (FCoE).

2. Description of the Related Art

Fibre Channel is a high reliability, high speed network technology that is often used in storage networking, particularly in storage area network (SAN) environments. Many data centers use Fibre Channel (FC) for storage networking, and, in conjunction, use Ethernet for TCP/IP networks. As a result, the data center has two separate networks to maintain. FCoE is a network protocol that encapsulates Fibre Channel frames in Ethernet frames in order to allow Fibre Channel to be used over an Ethernet infrastructure. FCoE thus allows storage traffic generated according to the FC protocol to share infrastructure with network traffic generated according to Ethernet protocols such as TCP/IP.

One connection type that FC supports is point-to-point. In point-to-point, the connected devices are directly attached. For example, a server may be attached to a storage device via a point-to-point connection in FC. Point-to-point allows the connected devices to use the full bandwidth of the connection, allows more consistent performance, and provides a high level of security. Technical Committee T11 of the International Committee for Information Technology Standards (INCITS), which is the committee responsible for FC interfaces, and has produced the Fibre Channel-Link Services (FC-LS) (INCITS 433:2007) standard. That document, at 6.2.2.4, identifies the process for performing a point to point login in FC.

However, point-to-point connections are currently unsupported in FCoE. Those administrators who might otherwise wish to use FCoE are not able to do so if they need point-to-point connections in their network. As a result, FCoE is not yet as flexible a solution as FC. This may deter administrators otherwise interested in the standard from implementing FCoE.

SUMMARY

Disclosed are a computer program product, an apparatus, a system, and a method for establishing a point to point connection between a first computing device and a second computing device connected by a lossless Ethernet connection. In one embodiment, the invention is a computer program product comprising a computer readable storage medium with computer readable program code. When executed, the code causes the computing device to send an FCoE Initialization Protocol (FIP) discovery solicitation to a predefined address. The FIP discovery solicitation may be sent in response to the lossless Ethernet connection that connects the first computing device and the second computing device being activated. The computing device also determines, during a FIP stage, whether the lossless Ethernet connection between the first computing device and the second computing device is a point-to-point connection. Finally, the computing device establishes a point-to-point connection between the first computing device and the second computing device according to the Fibre Channel (FC) protocol if it determines that the lossless Ethernet connection between the first computing device and the second computing device is a point to point connection.

In certain embodiments, the first computing device may also listen for one or a more FIP discovery advertisements generated by one or more FCoE Forwarders (FCFs) communicatively connected to the first computing device and separate from the first computing device. The first computing device may determine that the lossless Ethernet connection is a point-to-point connection if it receives no FIP discovery advertisements from the FCFs during a timeout period.

The first computing device may also receive a discovery solicitation sent to the predefined address by the second computing device and determine that the lossless Ethernet connection is a point-to-point connection if it receives no FIP discovery advertisements from an FCoE forwarder (FCF) during the timeout period and also receives only one remote FIP discovery solicitation at the predefined address.

In certain embodiments, the first computing device sends a second FIP discovery solicitation that comprises a point-to-point indicator if it determines that the lossless Ethernet connection is a point-to-point connection. This second FIP discovery solicitation may be sent to the MAC address of the second computing device or the ALL-ENode-MACS address.

In certain embodiments, the first computing device also receives a FIP discovery solicitation that includes a point-to-point indicator from the secondary computing device. The first computing device may send a FIP discovery advertisement having a point-to-point indicator to the MAC address of the second computing device if the first computing device receives the FIP discovery solicitation with the point-to-point indicator sent by the secondary computing device.

Also disclosed is an apparatus for establishing a point-to-point connection between a first computing device and a second computing device connected by a lossless Ethernet connection using FCoE protocol. The apparatus includes a discovery module that sends a first FIP discovery solicitation to a predefined address, a point module that sends a second FIP discovery solicitation comprising a point to point indicator to the second computing device, and a receipt module that receives a remote FIP discovery solicitation comprising a point to point indicator from the second computing device.

The apparatus also includes a response module that sends a FIP discovery advertisement comprising a point to point indicator to the second computing device if the receipt module receives the FIP discovery solicitation comprising the point to point indicator from the second computing device. A login module establishes a point to point connection between the first computing device and the second computing device.

In certain embodiments, the apparatus also includes a switch determination module that determines whether there is a switch in the lossless Ethernet connection. In such an embodiment, the point module may send the second FIP discovery solicitation if the switch module determines that there is not a switch in the lossless Ethernet connection.

The switch determination module may determine that there is no switch in the communication connection if the first computing device does not receive a FIP discovery advertisement from an FCoE forwarder (FCF) during a timeout period. The point module may send the second FIP discovery solicitation comprising the point to point indicator to the predefined address.

In other embodiments, the switch determination module may determine that there is no switch in the lossless Ethernet connection if: the first computing device does not receive a FIP discovery advertisement from an FCF during the timeout period; and the first computing device receives only one remote FIP discovery solicitation from the second computing device. In such an embodiment, the point module may send the second FIP discovery solicitation to the MAC address of the second computing device specified in the remote FIP discovery solicitation.

The invention may further be embodied in a system that includes a first computing device that includes an FCoE controller and an Ethernet port, along with some of the modules described above. The system may also include a second computing device that includes an FCoE controller and an Ethernet port, and at least a subset of the modules described above.

The invention may also include a method for establishing a Fibre Channel over Ethernet (FCoE) point-to-point connection between a first computing device and a second computing device that are connected by a lossless Ethernet connection. The method may include sending a first FIP discovery solicitation over the lossless Ethernet connection to an ALL-FCF-MACS group address, listening for FIP discovery solicitations sent over the lossless Ethernet connection by remote computing devices to the ALL-FCF-MACS group address for a timeout period, and sending a second FIP discovery solicitation having a point-to-point indicator in response to determining that no FIP discovery advertisements were received within the timeout period.

The method may also include sending a FIP discovery advertisement to a MAC address of the second computing device that generated the FIP discovery solicitation received by the first computing device in response to receiving a FIP discovery solicitation having a point-to-point indicator set. The method also includes establishing a point-to-point connection with the second computing device according to Fibre Channel protocol.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables establishing and maintaining a point-to-point connection in FCoE. The feature and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium that comprises computer readable code that performs a function when executed. As used herein, computer readable storage media are physical storage media capable of physically storing digital information. Computer readable storage media may be, for example, CDs, DRAM, RAM, hard drives, or others known in the art. In certain embodiments, the computer program product may be embodied in a computer readable medium which may exist in whole or in part as signals on a network. In certain embodiments, the present invention may exist only as software.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
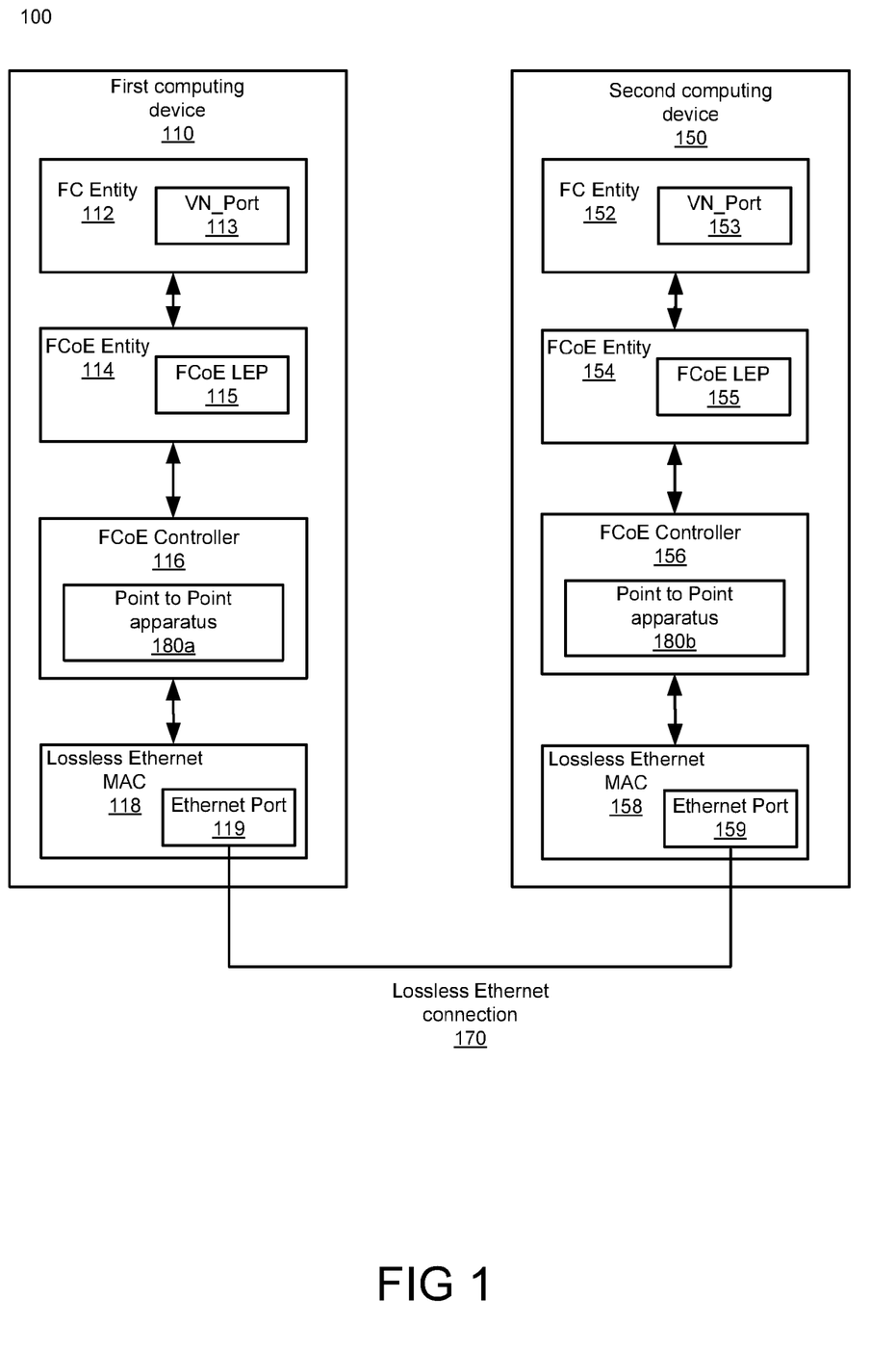
FIG. 1 is a schematic block diagram illustrating one embodiment of a system for establishing a point to point connection using FCoE.

FIG. 1 shows one embodiment of a system 100 in which the present invention may be practiced. The system 100 includes a first computing device 110 and a second computing device 150. The first computing device 110 includes an FC Entity 112, an FCoE entity 114, an FCoE controller 116, and a lossless Ethernet MAC 118.

The FC Entity 112 provides necessary functionality to enable Fibre Channel communications. The FC Entity 112 enables the first computing device 110 to communicate information using the FC protocol. The FC Entity 112 may include a VN_Port 113 that receive FC frames and forward them appropriately. The VN_Port 113 is dynamically instantiated.

The first computing device 110 also includes an FCoE entity 114 with an FCoE Link End Point (LEP) 115. The FCoE entity 114 provides necessary functionality to enable Fibre Channel communications over lossless Ethernet connections. Thus, an administrator familiar with FC can interact with devices in the system 100 as if the system were a true FC system 100. However, the FCoE entity 114 encapsulates FC within the Ethernet protocol, allowing the system 100 to use Ethernet for communications.

The first computing device also includes an FCoE controller 116. In certain embodiments, the functionality for enabling point-to-point communications in FCoE described herein is implemented in the FCoE controller 116. The FCoE controller 116 may comprise software and hardware elements to enable FCoE communications. Also shown is a Lossless Ethernet MAC 118 with an associated Ethernet port 119 for establishing an Ethernet connection with other computing devices, such as the second computing device 150.

The second computing device 150 contains an FC entity 152, an FCoE entity 154, an FCoE controller 156, and a lossless Ethernet MAC 158 similar to the components described in connection with the first computing device 110.

In certain embodiments, the first computing device 110 may be a device such as a server. The second computing device 150 may be a storage device for the first computing device 110. The first computing device 110 and the second computing device 150 are connected by a lossless Ethernet connection 170, over which information is shared according to the FCoE protocol. The lossless Ethernet connection 170 establishes a point-to-point connection between the first computing device 110 and the second computing device 150. As used in this application, a point-to-point connection is one that connects the first computing device 110 and the second computing device 150 using a dedicated connection. The lossless Ethernet connection 170 may include a bridge, but does not include switches.

In the embodiment shown in FIG. 1, the FCoE controllers 116 and 156 each include a point to point apparatus 180a and 180b respectively. The point to point apparatus 180a and 180b determine that the connection between the first computing device 110 and the second computing device 150 is a point to point connection and generate an appropriate point to point connection to enable communications between the first computing device 110 and the second computing device 150 using the FCoE protocol. In one embodiment, the point to point apparatus 180a and 180b enable the communication as part of the FCoE Initialization Protocol (FIP) that manages the discovery and login process.

The point to point apparatus 180a sends an FCoE Initialization (FIP) discovery solicitation to a predefined address when the lossless Ethernet connection 170 is activated. The lossless Ethernet connection 170 is activated when some action occurs that causes the first computing device 110 to attempt to connect to some other computing device over the lossless Ethernet connection 170. For example, the lossless Ethernet connection 170 may be activated when the connection is physically made (i.e., the Ethernet cable is plugged into the first computing device 110), when the first computing device 110 is turned on, when the hardware supporting the FCoE Controller 116 (Such as a Converged Network Adapter (CNA)), or otherwise activated.

The point to point apparatus 180a also determines, during the FIP stage, whether the lossless Ethernet connection between the first computing device and the second computing device is a point-to-point connection. In certain embodiments, the point to point apparatus 180a determines that there is a point-to-point connection if there are no switches in N a the fabric of the lossless Ethernet connection 170. The point to point apparatus 180b may perform similar steps to those described in connection with point to point apparatus 180a.

Once the point to point apparatus 180a determines that the first computing device 110 and the second computing device 150 are connected by a point to point connection, it establishes a point-to-point connection between the first computing device 110 and the second computing device 150 according to the FC protocol. For example, the point to point apparatus 180a may use the approach described in section 6.2.2.4, entitled "NX_Port response to FLOGI", of the FC-LS standard. Once the point to point connection is established, the point to point apparatus 180a may also take steps to maintain the connection.

Figure 2:
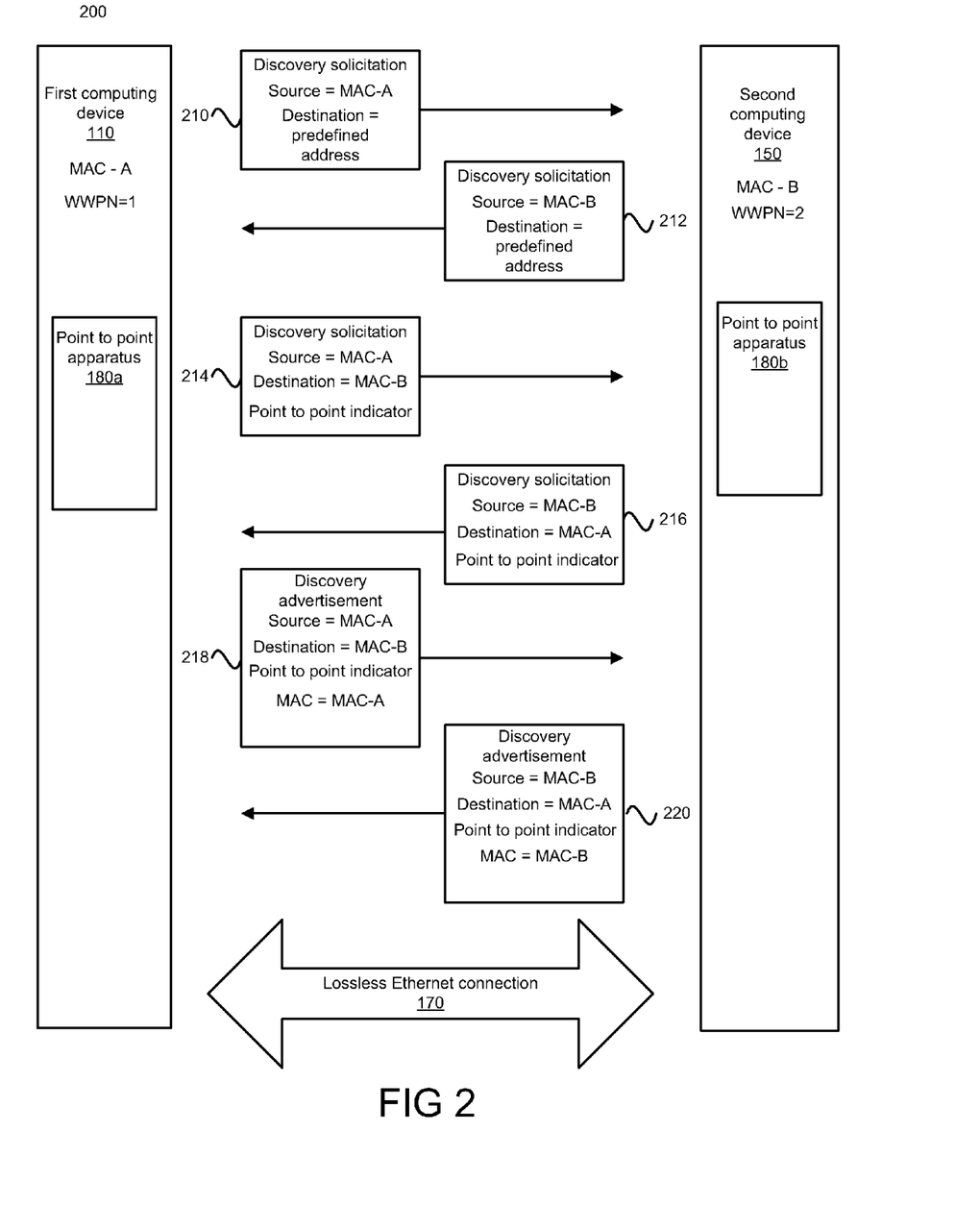
FIG. 2 is a schematic block diagram illustrating one embodiment of an approach to establishing a point to point connection using FCoE.

FIG. 2 shows an embodiment of a system 200 for establishing a point to point connection using FCoE. The system 200 includes a first computing device 110 and a second computing device 150 connected by a lossless Ethernet connection 170. The first computing device includes the point to point apparatus 180a, and may also include the computing components described in FIG. 1. In addition, the first computing device 110 has a MAC address MAC-A and a worldwide port name (WWPN) of 1. The second computing device 150 has a point to point apparatus 180b, a MAC address MAC-B and a WWPN of 2.

FIG. 2 also shows a representative exchange of messages, sent over the lossless Ethernet connection 170, to establish a point to point connection between the first computing device 110 and the second computing device 150. In one embodiment, the point to point apparatus 180a sends a first FCoE FIP discovery solicitation 210 to a predefined address. The first computing device 110 may do so in response to the lossless Ethernet connection 170 becoming active. The predefined address is an address that set before the FIP process begins that defines a location for one or more computing devices to send messages. In a preferred embodiment, the predefined address is the multicast address All-FCF-MACS as defined by the FCoE protocol. The discovery solicitation may also include the source address of the sender; for example, the MAC address MAC-A of the first computing device 110. As shown, both the first computing device 110 and the second computing device 150 send a first discovery solicitation 212. There is no requirement that the first computing device 110 send its first discovery solicitation 210 before the second computing device 150 sends the second discovery solicitation 212, or vice versa.

The first computing device 110 also sends a second discovery solicitation 214 that includes a point to point indicator. The point to point indicator demonstrates that the first computing device 110 believes the connection to be a point to point connection. In certain embodiments, the point to point indicator is a flag. The point to point indictor may be a flag in a FIP Operation format message, may be implemented as a descriptor in the descriptor list, or provided in another location within a FIP message. In certain embodiments, the point to point indictor is simply a bit that can be set to indicate point to point discovery.

The first computing device 110 sends the second discovery solicitation if it determines that the lossless Ethernet connection 170 provides a point to point connection between the first computing device 110 and the second computing device. For example, in certain embodiments, the first computing device 110 sends the second discovery solicitation 214 if it determines that there is no switch in the lossless Ethernet connection 170.

In certain embodiments, the first computing device 110 listens for FIP discovery advertisements generated and sent by Fibre Channel Forwarders (FCFs) over the lossless Ethernet connection 170. If the first computing device 110 does not receive a FIP discovery advertisement from an FCF during a timeout period, the first computing device 110 may decide to send the second discovery solicitation 214 with the point to point indicator set. The first computing device 110 may use this "timeout" test to determine that there are no switches in the fabric. In such an embodiment, the second discovery solicitation 214 may be sent to ALL-ENode-MACS predefined address.

In certain embodiments, the timeout period may be equal to twice the D_A_TOV (discovery advertisement timeout value) for the system. The D_A_TOV may be a system default value or set by an administrator for the system. In other embodiments, the timeout period may be some other value set by default or chosen by the administrator, and need not be tied to the D_A_TOV.

In certain embodiments, the first computing device 110 may also monitor how many FIP discovery solicitations it receives. In certain embodiments, the first computing device 110 sends the second discovery solicitation 214 only if the timeout test condition is met and if the first computing device 110 receives one and only one FIP discovery solicitation at the predefined address. As noted above, the predefined address may be the multicast address All-FCF-MACS as defined by the FC protocol. In such an embodiment, the second discovery solicitation 214 may be sent to the MAC address of the sender of the received discovery solicitation; in the example of FIG. 2, the first discovery solicitation 212 is the discovery solicitation received by the first computing device and the MAC address to which the second discovery solicitation 214 is sent is the MAC-B address. Thus, the first computing device 110 may use the number of FIP discovery solicitations received to determine whether or not there is a switch in the fabric or to otherwise determine that the lossless Ethernet connection 170 is a point to point Ethernet connection.

The second computing device 150 also sends a second discovery solicitation 216 with a point to point indicator set as illustrated in FIG. 2. The process for determining whether to send the second discovery solicitation 216, as well as where to send the second discovery solicitation, may be determined as described above in connection with the second discovery solicitation 214 sent by the first computing device 110.

In certain embodiments, the first computing device 110 sends a discovery advertisement 218 to the second computing device with a point to point indicator if the first computing device 110 receives a second discovery solicitation 216 with a point to point indicator set from the second computing device 150. The second computing device 150 similarly generates a second discovery advertisement 220 in response to receiving a second discovery solicitation 214 from the first computing device 110.

At this point, the first computing device 110 and the second computing device 110 establish a point to point connection between the first computing device 110 and the second computing device 150. In certain embodiments, the point to point connection is established using the approach defined in the FC protocol. For example, the first computing device 110 and the second computing device 150 may exchange fabric logins (FLOGI) and corresponding accepts (LS_ACC). The device with the larger WWPN value (in FIG. 2, the second computing device 150) sends the port login (PLOGI), which is accepted, and the point to point connection is thus established.

Figure 3:
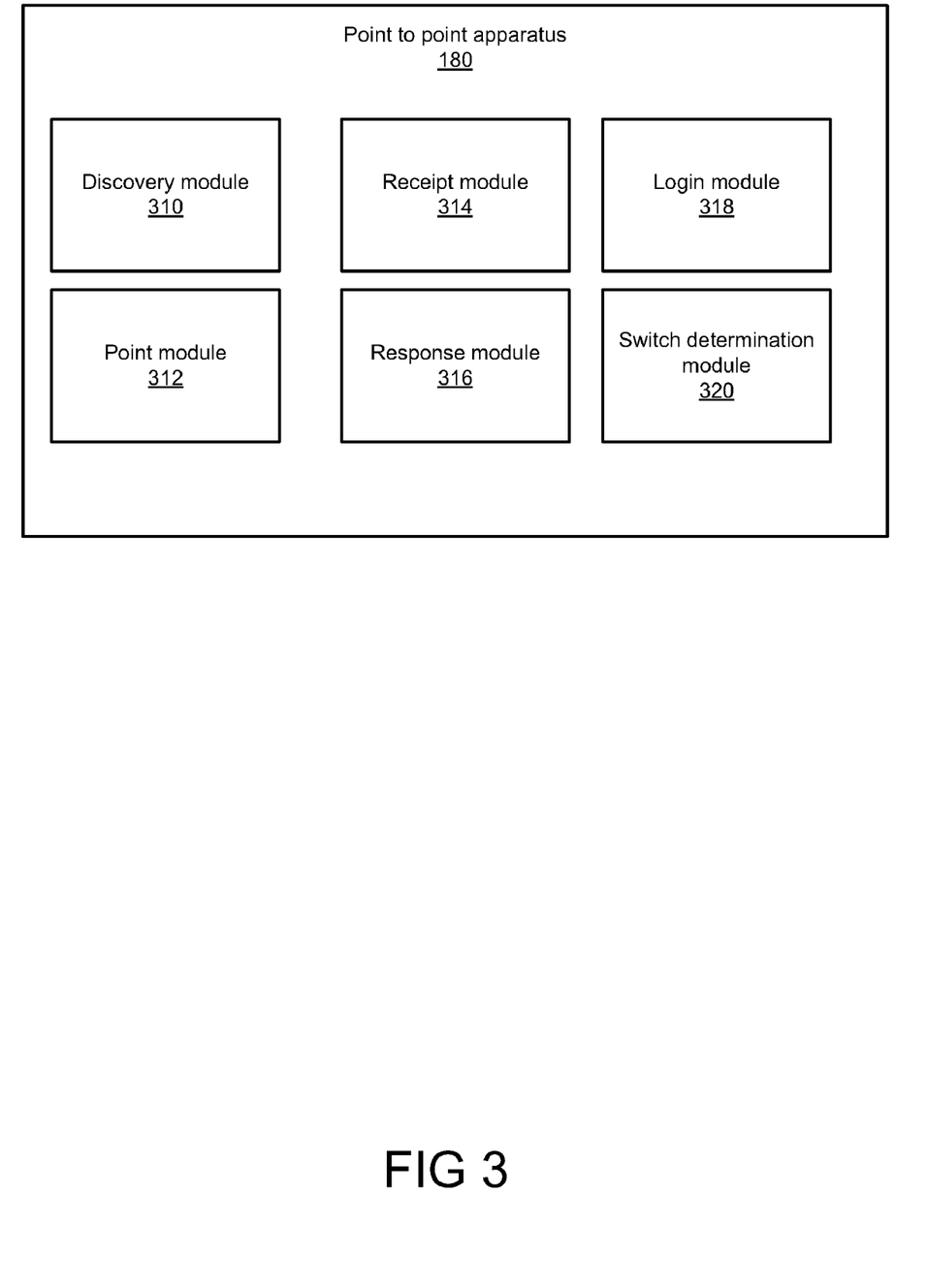
FIG. 3 is a schematic block diagram illustrating one embodiment of a point to point apparatus used in establishing a point to point connection.

FIG. 3 shows one embodiment of a point to point apparatus 180. In the depicted embodiment, the point to point apparatus 180 includes a discovery module 310, a receipt module 314, a login module 318, a point module 312, a response module 316, and a switch determination module 320. In certain embodiments, the modules are implemented as hardware. In other embodiments, the modules are implemented as software stored in computer readable storage media. In other embodiments, the modules may be a combination of hardware and software.

The discovery module 310 sends a first FIP discovery solicitation to a predefined address. As noted above, the predefined address may be the multicast address All-FCF-MACS as defined by the FCoE specification. The FIP discovery solicitation typically includes a source address that identifies the MAC address of the computing device that hosts the point to point apparatus 180.

The point module 312 sends a second FIP discovery solicitation that includes a point to point indicator. The point to point indicator may be a flag in the FIP, may be a descriptor, or other indicator within a FIP message. In certain embodiments, the point module 312 sends the second FIP discovery solicitation in response to the switch determination module 320 determining that there are no switches in the lossless Ethernet connection to which the computing device hosting the point to point apparatus 180 is attached.

The point to point apparatus 180 also includes a receipt module 314 that receives remote FIP discovery solicitations. The receipt module 314 may, in certain embodiments, listen for messages at predefined addresses such as All-FCF-MACS and All-Enode-MACS. In certain embodiments, the receipt module 314 can also determine whether the FIP discovery solicitation includes a point to point indicator. The receipt module 314 may receive FIP discovery solicitations from FCFs operating on switches or from Enodes operating on other end points such as servers and storage devices.

The response module 316 sends a FIP discovery advertisement that includes a point to point indicator. The response module 316 sends the FIP discovery advertisement to the device that sent the FIP discovery solicitation that included the point to point indicator received by the response module 316. In the example of FIG. 2, the response module 316 sends the FIP discovery advertisement to the second computing device 150. In certain embodiments, the FIP discovery advertisement is sent to the MAC address of the device that sent the FIP discovery solicitation.

The login module 318 establishes a point to point connection between the computing device that hosts the point to point apparatus 180 and the computing device that sent the FIP discovery solicitation having the point to point indicator. For example, the login module 318 may establish a connection between the first computing device and a remote second computing device. In certain embodiments, the login module 318 performs this function according to the FC protocol. Once the login module 318 establishing a point to point connection, the computing device hosting the point to point apparatus 180 and the remote computing entity (such as the second computing device in FIG. 2) can communicate over the point to point connection and take advantage of the attendant benefits.

The point to point apparatus 180 may also include a switch determination module 320. As noted above, the switch determination module 320 may determine whether there is a switch in the lossless Ethernet connection connecting the device hosting the point to point apparatus 180 and a second computing device. In addition, the switch determination module 180's determination that there are no switches in the lossless Ethernet connection may cause the point module 312 to send the second FIP discovery solicitation with a point to point indicator to the second computing device.

The switch determination module 320 may determine that there is no switch in the lossless Ethernet connection if the computing device hosting the point to point apparatus 180 has not received FIP discovery advertisements from FCFs hosted on switches during a timeout period. As noted above, the timeout period may be set by a user or an application. In one embodiment, where the switch determination module 320 determines that there are no switches in the lossless Ethernet connection based on the lack of FIP discovery advertisements from FCFs during the timeout period, the point module 312 sends the second FIP discovery solicitation to a predefined address such as the multicast address All-Enode-MACS.

In one embodiment, the switch determination module 320 also determines how may FIP discovery solicitations are received by the computing device hosting the point to point apparatus 180. In certain embodiments, if the host computing device receives only one FIP discovery solicitation at a predefined address (such as All-FCF-MACS), and the host computing device has not received a FIP discovery advertisement during the timeout period as described above, then the point module 312 sends the FIP discovery solicitation with the point to point indicator. In such an embodiment, the point module 312 may send the FIP discovery solicitation to the MAC address in the one received FIP discovery solicitation.

Figure 4:
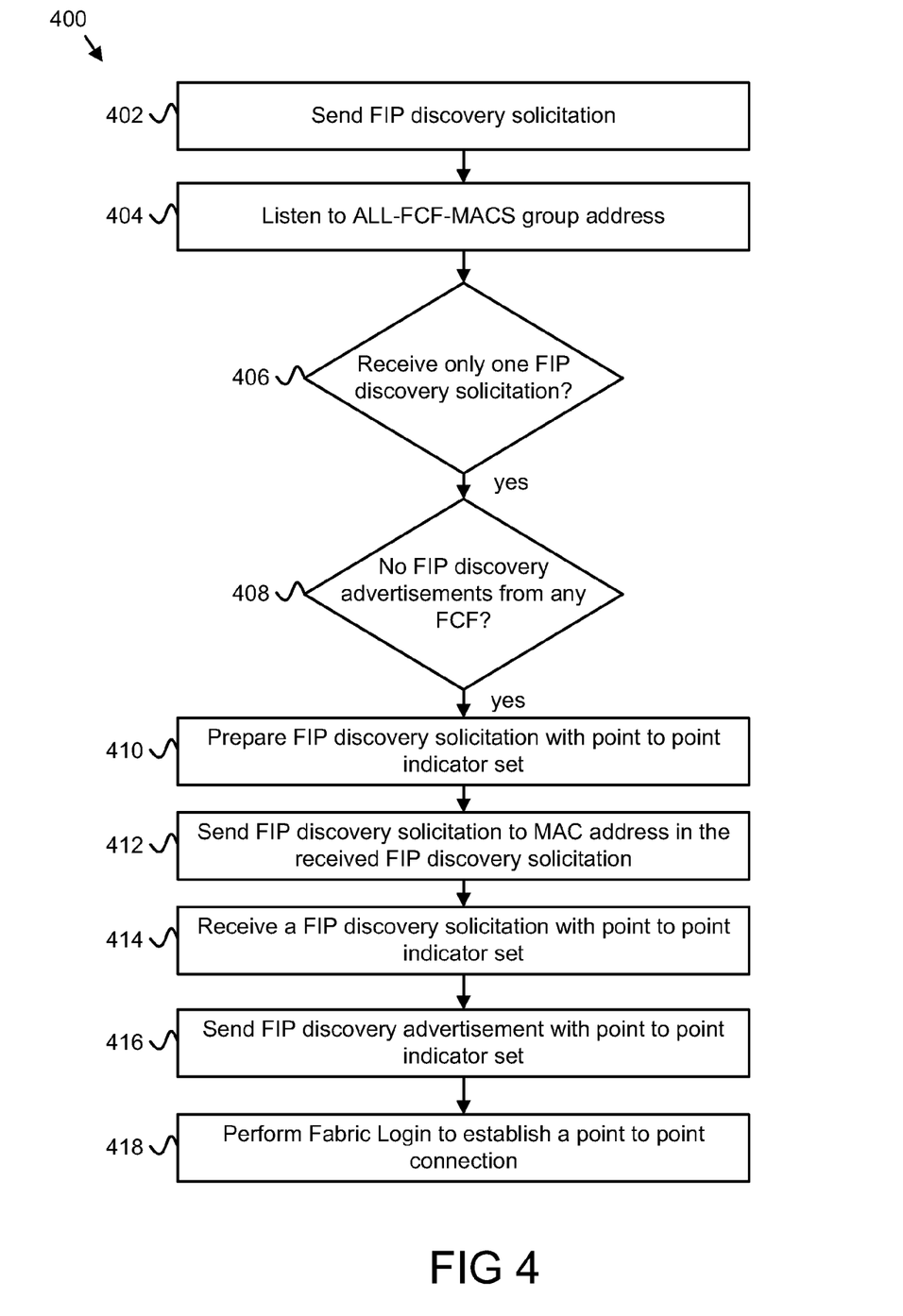
FIG. 4 is a schematic flow chart diagram illustrating one embodiment of a method for establishing a point to point connection using FCoE.

FIG. 4 shows one embodiment of a method 400 for establishing a point to point connection in FCoE. The method 400 begins with sending 402 a FIP discovery solicitation (also referred to in this application as a first FIP discovery solicitation) over a lossless Ethernet connection to the All-FCF-MACS group address. The method also includes listening 404 to the ALL-FCF-MACS group address for messages received at that address from other computing devices connected over the lossless Ethernet connection.

The method 400 then involves determining 406 whether the host computing device received only one FIP discovery solicitation over the lossless Ethernet connection. If the host computing device has received more than one FIP discovery solicitation, the host computing device does not establish a point to point connection and the method 400 ends. Another type of connection may be established as the multiple FIP discovery solicitations may indicate a different network topology.

If the host computing device receives only one FIP discovery solicitation, the method 400 involves determining 408 whether the host computing device has received any FIP discovery advertisements from FCFs. If the host computing device has received FIP discovery advertisements from FCFs, the host computing device concludes that it is not involved in a point to point connection and the method 400 ends.

If the host computing device determines that it has not received any FIP discovery advertisements, the method 400 involves preparing 410 a FIP discovery solicitation with a point to point indicator set. The FIP discovery solicitation with the point to point indicator is then sent 412 to the MAC address in the received FIP discovery solicitation. Since the host computing device received only one FIP discovery solicitation, as determined at step 406, the host computing device can easily determine the appropriate FIP discovery solicitation from which to extract the MAC address.

The method 400 also involves receiving 414 a FIP discovery solicitation with the point to point indicator set. The FIP discovery solicitation is received over the lossless Ethernet connection from a remote computing device. In response, the method 400 involves sending 416 a FIP discovery advertisement with the point to point indicator set to the remote computing device that generated the FIP discovery solicitation with the point to point indicator received at step 414.

At this point, the method 418 involves performing fabric login to establish a point to point connection with the remote computing device. In certain embodiments, performing fabric login involves exchanging FLOGIs and associated LS_ACCs, and sending a PLOGI if the WWPN of the host computing device is larger than that of the remote computing device. If the host computing device has a WWPN smaller than that of the remote computing device, the host computing device will receive a PLOGI and respond with a LS_ACC.

Figure 5:
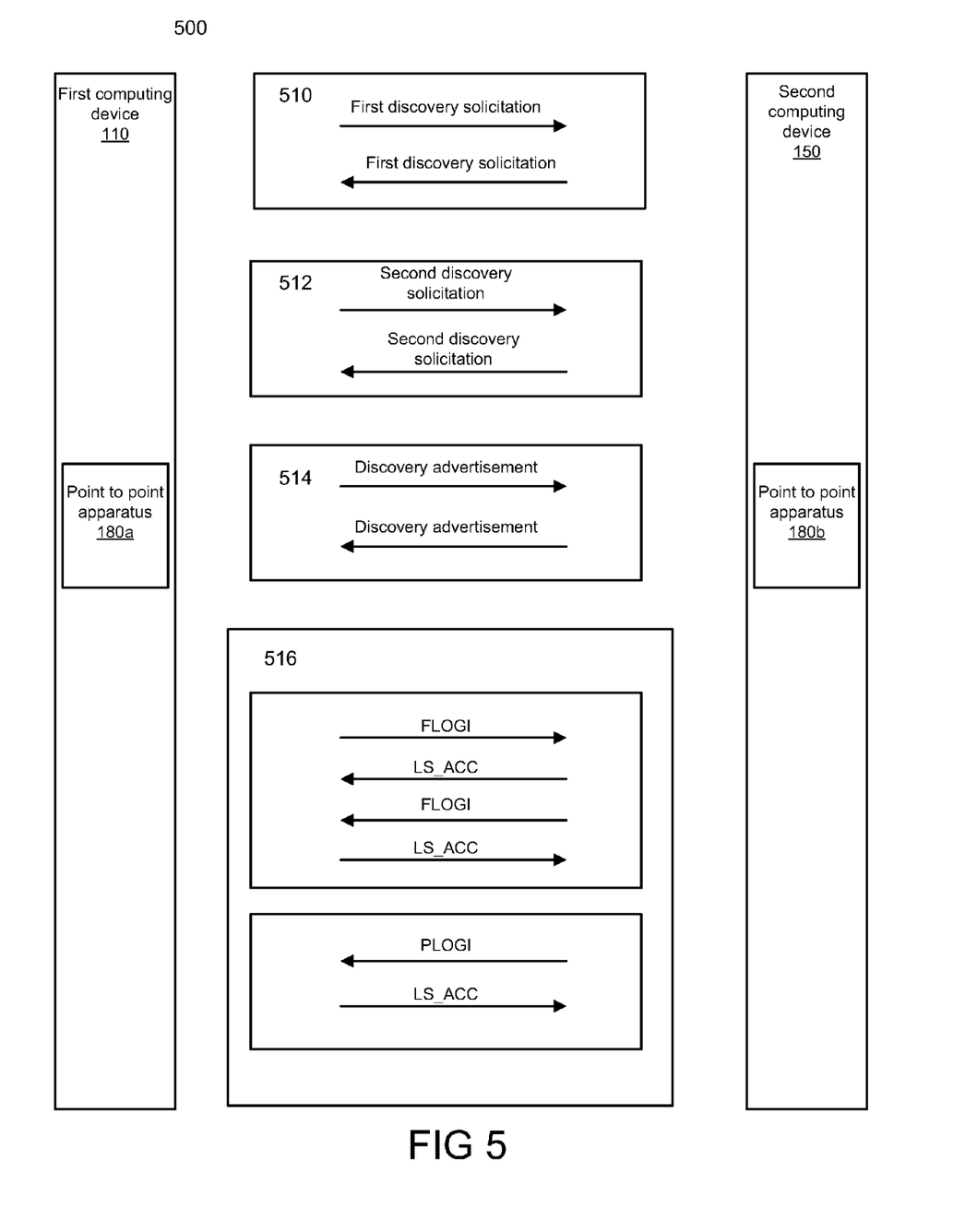
FIG. 5 a schematic block diagram illustrating one embodiment of a system and messages sent to establish a point to point connection using FCoE.

FIG. 5 is a representation of a system 500 including a first computing device 110 and a second computing device 150. FIG. 5 illustrates a series of messages exchanged between the first computing device 110 and the second computing device 150. From the perspective of the point to point apparatus 180*a*, the first computing device is the host computing device and the second computing device 150 is the remote computing device. Conversely, from the perspective of the point to point apparatus 180*b*, the second computing device 150 is the host computing device and the first computing device 110 is the remote computing device.

FIG. 5 shows a first exchange 510 that comprises the first computing device 110 sending the first discovery solicitation and the second computing device 150 sending its first discovery solicitation. The exchange 510 is a conceptual construct to aid in understanding the exchange of messages and information between the first computing device 110 and the second computing device 150. The exchange 510 may not have an actual analog in implementation. The first discovery solicitations may be broadcast to a predefined address on one or more remote computing devices connected by the lossless Ethernet connection.

In a second exchange 512, the first computing device sends a second discovery solicitation and the second computing device 150 sends a second discovery solicitation. The second discovery solicitations each include point to point indicators. The second discovery solicitations may be broadcast or may be sent to the particular MAC address of the relevant target of the message.

In a third exchange 514, the first computing device 110 sends a discovery advertisement in response to receiving the second discovery solicitation from the second computing device 150. Similarly, the second computing device 150 sends a discovery advertisement to the first computing device 110 in response to receiving the second discovery solicitation from the first computing device 110. The discovery advertisements also include point to point indicators.

In a fourth exchange 516, the first computing device 110 and the second computing device 150 establish a point to point connection. The exchanges 510 through 514 may be considered part of the FIP activity necessary to prepare the first computing device 110 and second computing device 150 for participating in a point to point connection, while the exchange 516 may be considered a point to point login in accordance with the FC protocol.

As detailed above, in one implementation the first computing device 110 sends a FLOGI to the second computing device 150, and the second computing device 150 responds with an LS_ACC. Similarly, the second computing device 150 sends a FLOGI to the first computing device 110 and the first computing device 110 responds with an LS_ACC. At this point, the computing device with the larger WWPN value sends a PLOGI and the WWPN with the smaller value receives the PLOGI and responds with an LS_ACC, at which point the point to point connection is established.

Figure 6:
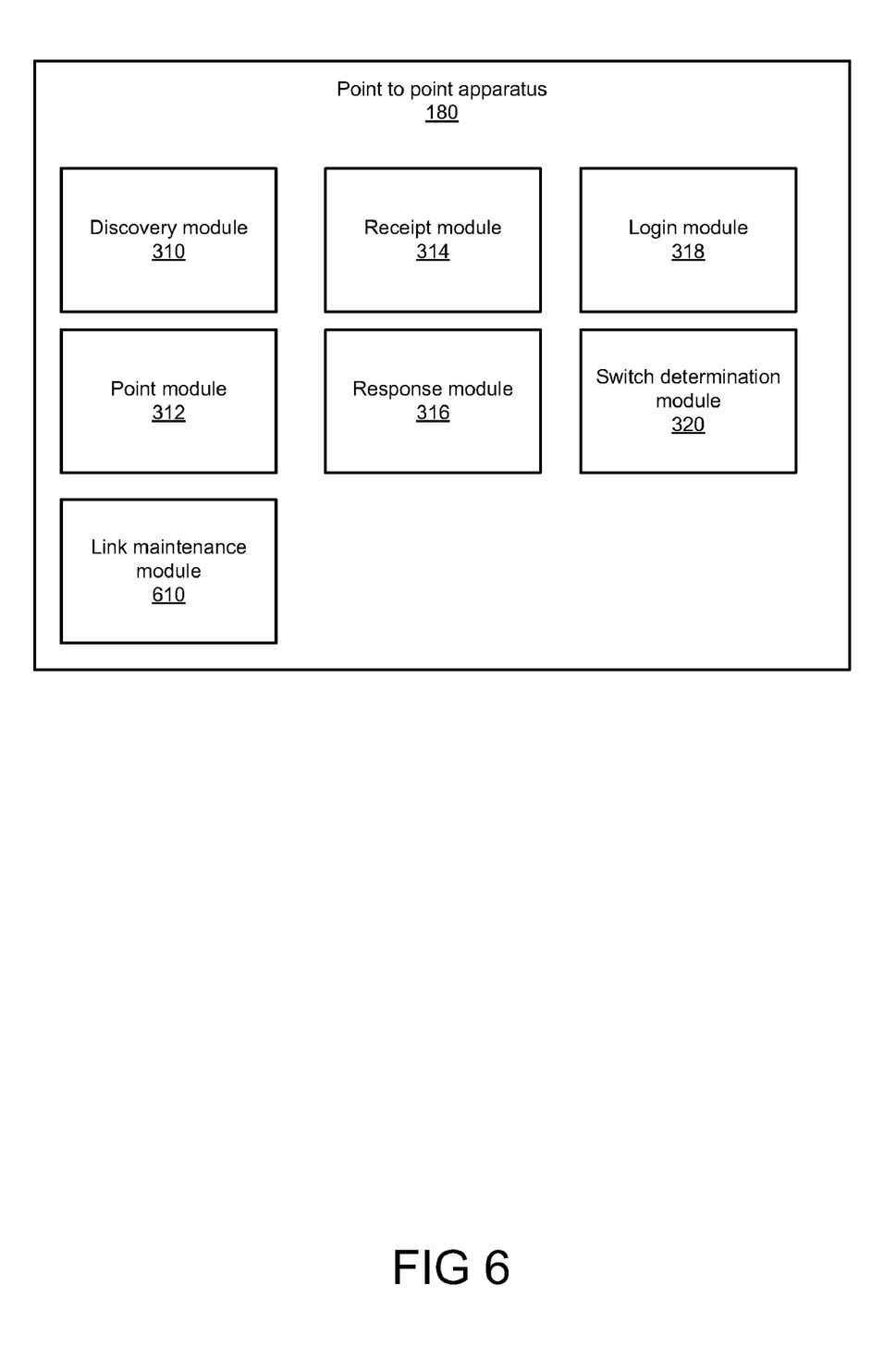
FIG. 6 is a schematic block diagram illustrating an additional embodiment of a point to point apparatus used in establishing a point to point connection.

In certain embodiments, as shown in FIG. 6, the point to point apparatus 180 also includes a link maintenance module 610. The link maintenance module 610 alters the link keep alive routine to ensure that the lossless Ethernet connection is maintained. In certain embodiments, the link maintenance module 610 ensures that the host computing device does not perform link maintenance activities. In such an embodiment, the integrity of the lossless Ethernet connection may be ensured by monitoring for physical link failures on the lossless Ethernet connection.

In other embodiments, the link maintenance module 610 generates FIP keep alive messages and ensures that the lossless Ethernet connection is active using those FIP keep alive messages as well as those generated by the second computing device 150. In one embodiment, the link maintenance module 610 sends FIP keep alive messages to the ENode address of the remote computing device. The FIP keep alive messages may be sent every FKA_ADV_PERIOD. In addition, the link maintenance module 610 receives FIP keep alive messages from the remote computing device. The link maintenance module 610 determines whether the lossless Ethernet connection is active or inactive based on the receipt of the FIP keep alive messages. In one embodiment, the link maintenance module 610 determines that the lossless Ethernet connection is inactive if it has not received a FIP keep alive message from the remote computing device for 2.5*FKA_ADV_PERIOD.

The present invention establishes a point-to-point connection between a first computing device and a second computing device using FCoE protocol. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium embodying a computer program product for establishing a point-to-point connection between a first computing device and a second computing device using Fibre Channel over Ethernet (FCoE) protocol, the computer program product having computer readable program code embodied therewith, the computer readable program code configured to:

send a FCoE Initialization Protocol (FIP) discovery solicitation to a predefined address in response to a lossless Ethernet connection that connects the first computing device and the second computing device being activated;

determine, during a FIP stage, whether the lossless Ethernet connection between the first computing device and the second computing device is a physical point-to-point connection that directly connects the first computing device and the second computing device without an intervening switch comprising a FCoE Forwarder (FCF); and establish a point-to-point connection between the first computing device and the second computing device according to a Fibre Channel (FC) protocol in response to determining that the lossless Ethernet connection between the first computing device and the second computing device is a physical point-to-point connection.

2. The non-transitory computer readable storage medium of claim 1, further comprising causing the first computing device to listen for one or more FIP discovery advertisements generated by one or more FCoE Forwarders (FCFs) communicatively connected to the first computing device and separate from the first computing device.

3. The non-transitory computer readable storage medium of claim 2, wherein the first computing device determines that the lossless Ethernet connection between the first computing device and the second computing device is a point-to-point connection in response to the first computing device receiving no FIP discovery advertisements from the one or more FCFs during a timeout period.

4. The non-transitory computer readable storage medium of claim 2, further comprising causing the first computing device to receive a discovery solicitation sent to the predefined address by the second computing device.

5. The non-transitory computer readable storage medium of claim 4, wherein the first computing device determines that the lossless Ethernet connection between the first computing device and the second computing device is a point-to-point connection in response to receiving no FIP discovery advertisements from a FCoE forwarder (FCF) during a timeout period and further in response to the first computing device receiving only one FIP discovery solicitation at the predefined address.

6. The non-transitory computer readable storage medium of claim 1, wherein the first computing device sends a second FIP discovery solicitation having a point-to-point indicator in response to determining that the lossless Ethernet connection is a point-to-point connection.

7. The non-transitory computer readable storage medium of claim 6, wherein the second FIP discovery solicitation is sent to one of the Media Access Control (MAC) address of the second computing device and a predefined address All-ENode-MACS.

8. The non-transitory computer readable storage medium of claim 1, further comprising causing the first computing device to receive a FIP discovery solicitation having a point-to-point indicator from the second computing device over the lossless Ethernet connection.

9. The non-transitory computer readable storage medium of claim 8, further comprising causing the first computing device to send a FIP discovery advertisement having a point-to-point indicator to a Media Access Control (MAC) address of the second computing device in response to receiving the FIP discovery solicitation having the point-to-point indicator from the second computing device.

10. An apparatus for establishing a point-to-point connection between a first computing device and second computing device connected by a lossless Ethernet connection using Fibre Channel over Ethernet (FCoE) protocol, the apparatus comprising:

a non-transitory computer readable storage medium;

a discovery module configured to send a first FCoE Initialization Protocol (FIP) discovery solicitation to a predefined address;

a point module configured to send a second FIP discovery solicitation comprising a point to point indicator;

a receipt module configured to receive an incoming FIP discovery solicitation comprising a point to point indicator from the second computing device, the lossless Ethernet connection connecting the first computing device to the second computing device without an intervening switch comprising a FCoE Forwarder (FCF);

a response module configured to send a FIP discovery advertisement comprising a point to point indicator to the second computing device in response to the receipt module receiving the incoming FIP discovery solicitation comprising the point to point indicator; and a login module configured to establish a point to point connection between the first computing device and the second computing device.

11. The apparatus of claim 10, further comprising a switch determination module that determines whether there is a switch in the lossless Ethernet connection that connects the first computing device and the second computing device.

12. The apparatus of claim 11, wherein point module sends the second FIP discovery solicitation in response to the switch determination module determining that there is not a switch in the lossless Ethernet connection.

13. The apparatus of claim 12, wherein the switch determination module determines that there is no switch in the communication connection in response to the first computing device not receiving a FIP discovery advertisement from a FCoE forwarder (FCF) during a timeout period.

14. The apparatus of claim 12, wherein the point module sends the second FIP discovery solicitation comprising the point to point indicator to the predefined address.

15. The apparatus of claim 13, wherein the switch determination module determines that there is no switch in the lossless Ethernet connection in response to: the first computing device not receiving a FIP discovery advertisement from a FCoE forwarder (FCF) during a timeout period; and the first computing device receiving only one FIP discovery solicitation from the second computing device at the predefined address.

16. The apparatus of claim 15, wherein the point module sends the second FIP discovery solicitation comprising the point to point indicator to the Media Access Control (MAC) address of the second computing device specified in the incoming FIP discovery solicitation.

17. The apparatus of claim 10, wherein the Fibre Channel over Ethernet (FCoE) protocol comprises a network protocol configured to encapsulate Fibre Channel frames in Ethernet frames to enable Fiber Channel communication over the lossless Ethernet connection.

18. A system for establishing a point-to-point connection between a first computing device and a second computing device connected by a lossless Ethernet connection using Fibre Channel over Ethernet (FCoE) protocol, the system comprising:

a first computing device comprising a FCoE controller and an Ethernet port, the first computing device further comprising:

a discovery module configured to send a first FCoE Initialization Protocol (FIP) discovery solicitation to a predefined address;

a point module configured to send a second FIP discovery solicitation comprising a point to point indicator;

a receipt module configured to receive an incoming FIP discovery solicitation comprising a point to point indicator from a second computing device;

a response module configured to send a FIP discovery advertisement comprising a point to point indicator to the second computing device in response to the receipt module receiving the incoming FIP discovery solicitation comprising the point to point indicator; and a login module configured to establish a point to point connection between the first computing device and the second computing device;

the second computing device comprising a FCoE controller and an Ethernet port; and a lossless Ethernet connection directly connecting the Ethernet port of the first computing device directly to the Ethernet port of the second computing device without an intervening switch comprising a FCoE Forwarder (FCF).

19. The system of claim 18, further comprising a switch determination module that determines whether there is a switch in the lossless Ethernet connection that connects the first computing device and the second computing device.

20. The system of claim 19, wherein the point module sends the second FIP discovery solicitation in response to the switch module determining that there is not a switch in the lossless Ethernet connection.

21. The system of claim 19, the second computing device further comprising:

a discovery module configured to send a first FCoE Initialization Protocol (FIP) discovery solicitation to the predefined address;

a point module configured to send a second FIP discovery solicitation comprising a point to point indicator;

a receipt module configured to receive an incoming FIP discovery solicitation comprising a point to point indicator from the first computing device;

a response module configured to send a FIP discovery advertisement comprising a point to point indicator to the first computing device in response to the receipt module receiving the incoming FIP discovery solicitation comprising the point to point indicator; and a login module configured to establish a point to point connection between the first computing device and the second computing device.

22. A method for establishing a Fibre Channel over Ethernet (FCoE) point-to-point connection between a first computing device and a second computing device that are connected by a lossless Ethernet connection, the method comprising:

sending a first FCoE Initialization Protocol (FIP) discovery solicitation over the lossless Ethernet connection directly connecting the first computing device and the second computing device, without an intervening switch comprising a FCoE Forwarder (FCF), to a ALL- FCoE Forwarders (FCF)-Media Access Controls (MACS) group address;

listening for one or more incoming FIP discovery solicitations sent over the lossless Ethernet connection by one or more computing devices to the ALL-FCF-MACS group address for a timeout period;

sending a second FIP discovery solicitation having a point-to-point indicator in response to determining that no FIP discovery advertisements were received within the timeout period;

sending a FIP discovery advertisement to a Media Access Control (MAC) address of the second computing device that generated the incoming FIP discovery solicitation received by the first computing device, the FIP discovery advertisement having the point-to-point indicator, in response to receiving the incoming FIP discovery solicitation having the point-to-point indicator; and establishing a point-to-point connection with the second computing device according to Fibre Channel protocol.

23. The method of claim 22, wherein the second FIP discovery solicitation is sent to the MAC address of the second computing device.

24. The method of claim 22, wherein the second FIP discovery solicitation is only sent further in response to determining that only one incoming FIP Discovery solicitation is received by the first computing device at the ALL-FCF-MACs group address.

* * * * *